Figure 1:
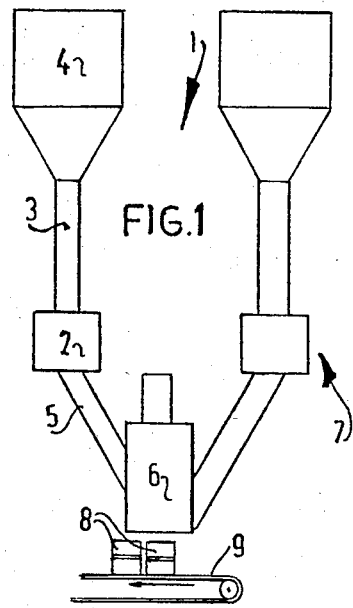

United States Patent [19]
van Doren

[11] Patent Number: 4,601,384
[45] Date of Patent: Jul. 22, 1986

[54] APPARATUS FOR FEEDING CAN BODIES

[75] Inventor: Hendrik D. van Doren, Deventer, Netherlands

[73] Assignee: Thomassen & Drijver-Verblifa NV, Deventer, Netherlands

[21] Appl. No.: 300,348

[22] Filed: Sep. 8, 1981

[51] Int. Cl.⁴ .............................................. B65G 29/00
[52] U.S. Cl. .................................. 198/481.1; 198/723
[58] Field of Search ............... 198/722, 440, 453, 525, 198/532, 531, 562, 540, 553, 359, 563, 461, 534, 459, 624, 481, 491, 723, 481.1; 221/266, 277, 222

[56] References Cited

U.S. PATENT DOCUMENTS

| | | | |
|---|---|---|---|
| 1,075,891 | 10/1913 | Ayars | 198/453 |
| 2,829,757 | 4/1958 | Breeback | 198/459 |
| 3,115,232 | 12/1963 | Carter | 198/459 |
| 4,273,235 | 6/1981 | Rustand | 198/624 |

FOREIGN PATENT DOCUMENTS

| | | | |
|---|---|---|---|
| 559124 | 6/1958 | Canada | 221/266 |
| 1808785 | 6/1970 | Fed. Rep. of Germany | 221/266 |
| 325353 | 3/1935 | Italy | 198/525 |
| 2023082 | 12/1979 | United Kingdom | 198/459 |

Primary Examiner—Joseph E. Valenza
Assistant Examiner—Kyle E. Shane
Attorney, Agent, or Firm—Charles E. Brown

[57] ABSTRACT

This disclosure relates to an apparatus for feeding can bodies serially. The apparatus includes a delivery path wherein can bodies arranged in a row are presented one at a time to a feed apparatus wherein a rotating cam member receives the leading can body or similar cylindrical object and moves the same from the feed path to a delivery path. Several different types of feed mechanisms are illustrated, and most particularly there is provided an arcuate guide path which is concentric to a shaft carrying the cam member with the cam member being particularly configured for cooperation with the arcuate path. The cam member will preferably have a partially spiral-shaped part. In a preferred embodiment, the delivery path stops immediately adjacent the cam member and there is a stop member against which the can is held by a cylindrical surface of the cam member. The can is moved endwise away from the stop out of the delivery path.

2 Claims, 5 Drawing Figures

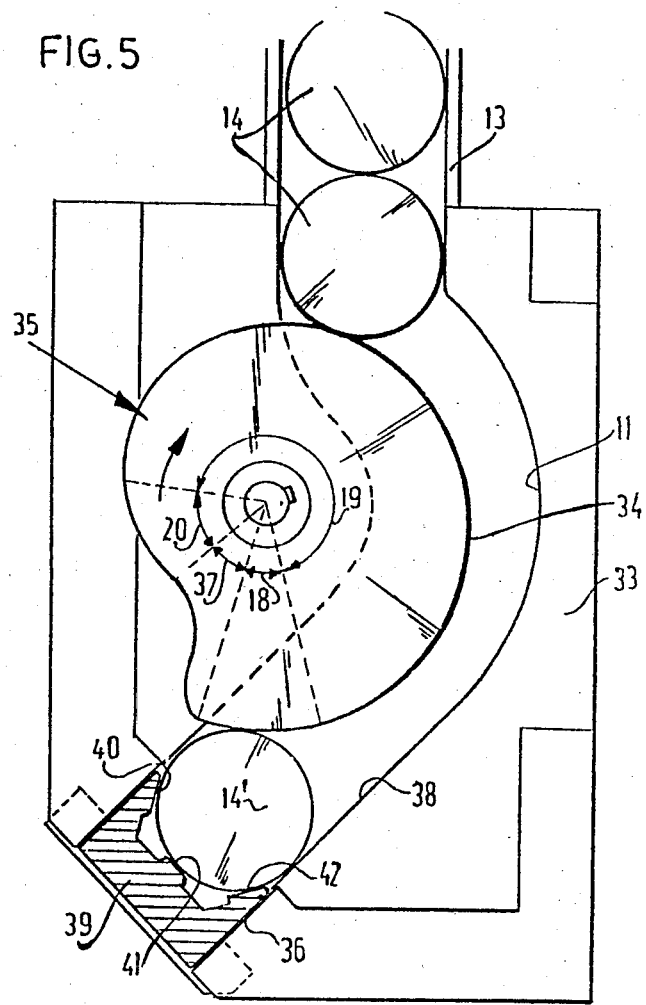

APPARATUS FOR FEEDING CAN BODIES

The invention relates to a device for individual conveyance of a row of cylindrical objects, for example, tins, tin covers or the like further along a circular path by means of a rotatable driving member.

In a known device of the kind set forth the rotatable driving member is formed by a circular disc having a plurality of peripheral recesses of a shape matching the curvature of the objects to be conveyed. Each time when the lowermost object of the row is removed, the whole row drops down until the lowermost object is retained by the peripheral disc part between two recesses. As soon as the next following recess reaches the then lowermost object, the latter drops down until it rests on the bottom of the meanwhile further displaced recess.

The disc rotates within an arcuate gutter and thus defines a path formed by an arc of a circle for the objects to be conveyed.

It will be obvious that the transport frequency is limited by the fact that each time the lowermost object has to drop into a recess out of a standstill.

One object of the invention is to enhance the attainable transport frequency by maintaining a continuous movement of the whole row of objects. For this purpose the invention provides a device of the kind set forth in the preamble, which is characterized in that the driving member is formed by a cam disc the peripheral surface of which has at least one at least partially spiral-shaped part. By the co-operation between the individual lowermost object and the rotating cam disc it is ensured that the lowermost object and hence the whole row of objects will be continuously moving.

Preference is given to that embodiment in which the radial height of the or each cam of the disc is smaller than the diameter of the object to be conveyed. In this case, when the lowermost object is removed, the next following object can, for some time, freely move under the action of the forces exerted thereon i.e. either the pressing force exerted on the row or, in the case of a vertical row, the force of gravity.

Preferably the or each operative cam surface has a slightly S-shaped structure, whose part adjoining the periphery of the disc is directed outwardly.

A particularly attractive development of the inventive idea set out above resides in a device for the individual conveyance of an object to a processing station where the object has to be immovably and accurately positioned for a given time interval. Hitherto a reciprocatory feeding mechanism has been employed to this end for grasping each time the lowermost object. This mechanism has a relatively complex and vulnerable structure and as a result of the high inertia forces involved it often occurred that due to deformations of material or even to rupture parts of the engaging mechanism caused damage of the processing station.

With regard to the foregoing the invention has furthermore for its object to provide a device which permits of positioning the objects with extreme accuracy at the processing station, whilst inertia forces as a source of disturbance are eliminated.

In order to obtain the last-mentioned structure the invention provides a device of the kind set forth which is characterized in that the at least partially spiral-shaped part comprises, away from the radially furthest remote point, a circular-arc-shaped part and a spiral-shaped part, the arcuate part being joined by a guide path at the end of which is provided a stop member positioned in a manner such that an object to be conveyed accurately fits in between said stop member and the arcuate part and in that furthermore means are provided for the removal of each object being in contact with the stop member in an axial direction.

The stop member may have at least two impact surfaces. When using two impact surfaces the object concerned is completely fixed in place by the two surfaces and the arcuate part of the cam disc. As an alternative, the stop member may have a shape corresponding with that of the objects.

The invention will now be described with reference to the drawing showing a few potential embodiments, to which, however, the invention is not limited. The drawing shows in FIG. 1 a schematic view of a processing equipment, the conveying device embodying the invention forming part thereof, FIG. 2 a sectional view of a first embodiment of the device in accordance with the invention, FIG. 3 a sectional view of a second embodiment of a device in accordance with the invention, FIG. 4 a sectional view of a third embodiment of a device in accordance with the invention, FIG. 5 an important fourth embodiment of the device in accordance with the invention, which is provided with means for maintaining an immovable, accurately defined position of each conveyed object for a given time interval.

FIG. 1 shows a processing equipment 1 comprising a device 2 embodying the invention. Above the device 2 is arranged a pipe 3 holding a vertical row or column of tins originating from a storage station 4. Through a delivery gutter 5 the tins conveyed one by one by the device are fed to the processing station 6, which communicates with a dosing device 7. The operation of the dosing device 7 is linked by means not shown to the conveying device embodying the invention in a manner such that at each arrival of a tin at the station 6 a corresponding amount of filling material is dispensed by the dosing device 7. After completion of this operation the filled tin 8 is further transported by a conveyor belt 9.

Figure 2:
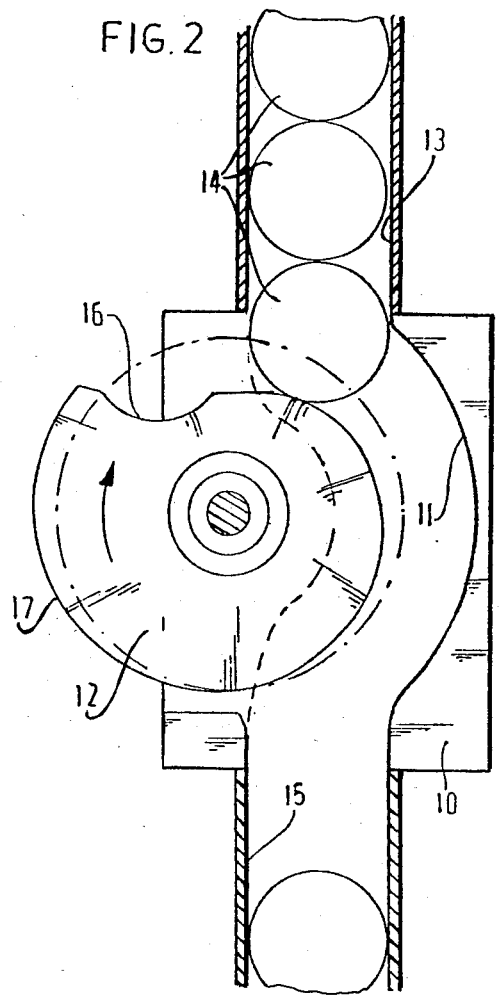

FIG. 2 shows a first embodiment of a device in accordance with the invention. This device 10 according to the invention comprises a circular-arc-shaped gutter 11 and a rotatable cam disc 12 concentrical with the former, a feeding gutter 13 for the cylindrical objects 14 adjoining the gutter 11 and a delivery gutter 15 adjoining the other end of the gutter 11.

The cam disc 12 can be rotatably driven in the direction indicated by the arrow.

The peripheral surface of the cam disc 12 has an operative cam surface 16 of slightly S-shaped form and on both sides thereof adjoining, substantially spiral-shaped parts 17.

Figure 3:
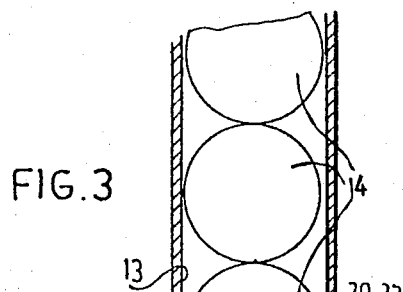
Figure 3:
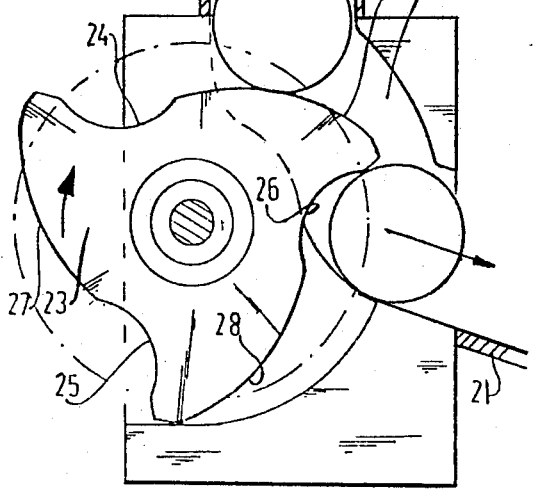

FIG. 3 shows a second embodiment of a device in accordance with the invention. Contrary to the embodiment of FIG. 2 the feeding gutter 13 and the delivery guide surface 21 are not in line with one another, but they are at an angle differing from 180°. As a result the further arcuate gutter 22 has a smaller length than in the case of FIG. 2. The most important difference from the first embodiment, however, resides in the form of the cam disc 23. In this embodiment it has three operative cam surfaces 24, 25 and 26 and three intermediate, substantially spiral-shaped parts 27, 28 and 29. In this embodiment the spiral-shaped parts 27, 28, 29 have the shape of a linear spiral. It will be obvious, however, that like in the embodiment of FIG. 2 they may have the shape of an arc of a circle, a linear spiral or a quadratic spiral.

As compared with FIG. 2 the embodiment of FIG. 3 has the advantage that the cam disc can rotate at a three times lower speed whilst the transport frequency is maintained.

Figure 4:
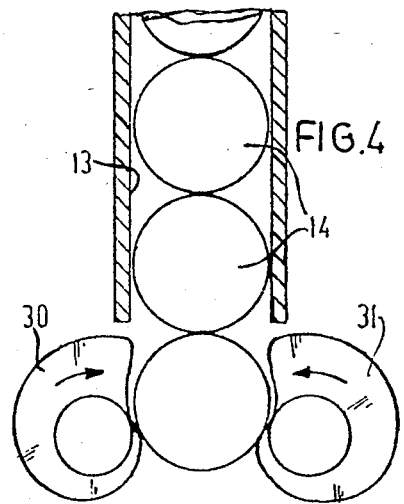

FIG. 4 shows a third embodiment of the invention in which the cylindrical objects 14 emanating from the feeding gutter 13 are further conveyed one by one by two cam discs 30, 31 arranged on both sides of the feeding gutter 13 and adapted to be rotatably driven in opposite senses. The drive of the cam discs 30, 31 is performed by rigid coupling. The directions of rotation are indicated by arrows. The invention is not limited to the embodiments described and illustrated in the drawings. It will be obvious that according to need the cam disc may have, for example, two or more than three operative cam surfaces. In each embodiment the specific, desired form of the spiral-shaped part may be chosen according to need.

FIG. 5 shows a device 33 embodying the invention comprising a cam disc 35 for conveying each object 14 to a processing station 36, where the object has to be immovably and accurately positioned for a given time interval.

In this important embodiment the peripheral surface 34 has three differently shaped parts. These three parts are briefly indicated in the Figure by the corresponding angles of subtension to the centre of rotation of the disc. The first part 18 has the shape of an arc of a circle, the second part 19 has the shape of a linear spiral and the third part 20 has the shape of a quadratic spiral.

An operative cam surface 37 is located between the parts 18 and 20.

With the arcuate gutter 11 is connected a guide path 38, at the end of which a stop member 39 is provided. In the embodiment shown in FIG. 5 the member 39 has three stop surfaces 40, 41, 42.

In the situation illustrated a cylindrical object 14' is located at the processing station 39. It is supported along three axial lines formed by the surfaces 40, 41, 42; from the other side it is held enclosed along an axial line by the arcuate part 18 of the cam disc 35. This embracement can be maintained at the longest for the time interval for which the object 14' is in contact with the part 18. This time interval is equal to the quotient of the angle subtended by the part 18 and the angular speed of the cam 35. Within this time interval of a standstill, also termed a "dwell-interval" the object can be treated. The object 14' is removed in an axial direction before the next-following object arrives at said place.

I claim:

1. A device for conveying cylindrical objects along an arcuate path, a shaft having an axis, said path being concentric with said shaft and being at least in part defined by a guide member, and a driving member carried by said shaft for sequentially moving cylindrical objects along said path, said driving member being in the form of a cam member having a peripheral surface which includes at least one partially spiral-shaped part, said at least partially spiral-shaped part including away from a point radially furthest remote from said axis a part of said cam member shaped in the form of an arc of a circle and a spiral-shaped part, said arcuate path being adjoined by a terminal guide path at an end of which is located a stop member positioned such that a cylindrical object to be transported accurately fits between said stop member and said part of said cam member shaped in the form of an arc of a circle, said spiral-shaped part including a linearly spiral-shaped part and a quadratically spiral-shaped part.

2. A device for conveying cylindrical objects along an arcuate path, a shaft having an axis, said path being concentric with said shaft and being at least in part defined by a guide member, and a driving member carried by said shaft for sequentially moving cylindrical objects along said path, said driving member being in the form of a cam member having a peripheral surface which includes at least one partially spiral-shaped part, said partially spiral-shaped part including a linearly spiral-shaped part and a quadratically spiral-shaped part.

* * * * *